United States Patent
Tak

(10) Patent No.: US 8,060,140 B2
(45) Date of Patent: Nov. 15, 2011

(54) METHOD AND APPARATUS FOR INCREASING DATA READ SPEED FROM SUBSCRIBER IDENTITY MODULE

(75) Inventor: Hyun-Wook Tak, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1105 days.

(21) Appl. No.: 11/711,501

(22) Filed: Feb. 27, 2007

(65) Prior Publication Data

US 2007/0222735 A1    Sep. 27, 2007

(30) Foreign Application Priority Data

Feb. 27, 2006   (KR) .................. 10-2006-0018775

(51) Int. Cl.
*H04B 1/38* (2006.01)
(52) U.S. Cl. ........................................ 455/558
(58) Field of Classification Search ............ 455/558
See application file for complete search history.

(56) References Cited

U.S. PATENT DOCUMENTS

| | | | | |
|---|---|---|---|---|
| 6,012,634 | A * | 1/2000 | Brogan et al. | 235/380 |
| 6,501,962 | B1 * | 12/2002 | Green | 455/558 |
| 6,529,727 | B1 * | 3/2003 | Findikli et al. | 455/411 |
| 6,799,057 | B1 * | 9/2004 | Liverotti | 455/558 |
| 6,847,831 | B2 * | 1/2005 | Huber | 455/558 |
| 6,934,391 | B1 * | 8/2005 | Linkola et al. | 380/247 |
| 7,177,915 | B2 * | 2/2007 | Kopchik | 709/217 |
| 7,197,189 | B2 * | 3/2007 | Adelmann | 382/239 |
| 7,406,332 | B1 * | 7/2008 | Gaillard et al. | 455/558 |
| 2004/0132449 | A1 * | 7/2004 | Kowarsch | 455/432.1 |
| 2004/0164142 | A1 * | 8/2004 | Flugge et al. | 235/380 |
| 2005/0239504 | A1 * | 10/2005 | Ishii et al. | |
| 2007/0087783 | A1 * | 4/2007 | Dahms et al. | 455/557 |

FOREIGN PATENT DOCUMENTS

| | | | |
|---|---|---|---|
| EP | 1383054 A1 | | 7/2002 |
| JP | 200099533 | * | 4/2000 |
| JP | 2000243093 | * | 9/2000 |
| JP | 200511171 | * | 1/2005 |

OTHER PUBLICATIONS

Sachin Agarwal et al.; "On the Scalability of Data Synchronization Protocols for PDAs and Mobile Devices"; IEEE Network; Jul./Aug. 2002; pp. 22-28.
ETSI TS 100 812-2; V2.4.1; "Terrestrial Trunked Radio (TETRA); Subscriber Identity Module to Mobile Equipment (TSIM-ME) Interface; Part 2: Universal Integrated Circuit Card (UICC); Characteristics of the TSIM application", Aug. 2005.

* cited by examiner

*Primary Examiner* — Lester Kincaid
*Assistant Examiner* — Nathan Mitchell
(74) *Attorney, Agent, or Firm* — The Farrell Law Firm, P.C.

(57) ABSTRACT

Provided is a method of efficiently reducing time taken for reading data from a SIM. For this purpose, the valid records of each EF are checked and only valid records with data are selectively read from a desired EF.

9 Claims, 6 Drawing Sheets

| Identifier : 'XXXX' | Structure: Linear fixed | Optional |
|---|---|---|
| SFI: Optional | | |
| Record length: X bytes | Update Activity : Low | |
| Access Conditions :<br>    READ                      ALW<br>    UPDATE             ALW<br>    DEACTIVATE    ADM<br>    ACTIVATE       ADM | | |

| Bytes | Description | M/O | Length |
|---|---|---|---|
| 1 - X | Record Number TLV data objects | M | X bytes |

METHOD AND APPARATUS FOR INCREASING DATA READ SPEED FROM SUBSCRIBER IDENTITY MODULE

PRIORITY

This application claims priority under 35 U.S.C. §119 to an application entitled "Method and Apparatus for Increasing Data Read Speed from Subscriber Identity Module" filed in the Korean Intellectual Property Office on Feb. 27, 2006 and assigned Ser. No. 2006-18775, the contents of which are incorporated herein by reference.

BACKGROUND OF THE INVENTION

1. Field of the Invention

The present invention relates generally to a method and apparatus for increasing a speed at which data is read from a Subscriber Identity Module (SIM), and in particular, to a method and apparatus for efficiently reducing the time required to read data from a SIM.

2. Description of the Related Art

Smart card modules such as a SIM, a User Identity Module (UIM), and a Universal Subscriber Identity Module (USIM) are widely used in mobile terminals. A SIM card, which is inserted into a European Global System for Mobile communication (GSM) terminal, stores non-volatile data such as a personal phonebook, carries out limited encryption, and implements software. A UIM card supports multiple modes in Code Division Multiple Access (CDMA) and GSM terminals. A USIM card is inserted into a 3rd Generation (3G) mobile terminal.

The SIM card is selected as an example and described below with reference to FIG. 1. FIG. 1 illustrates the file system structure for a typical SIM card.

Referring to FIG. 1, the file system of the SIM card includes a Master File (MF), Dedicated Files (DFs) and Elementary Files (EFs). When the SIM card operates, the MF is the first to be selected and set as the current directory. The DFs are dedicated files for respective services to support multiple functions required for service provider-specific services (telecom service) and GSM services. Each DF has a plurality of EFs for storing data used for each service.

The thus-configured SIM card has been developed to store a variety of data for which its memory capacity continues to increase from tens of kilobytes to hundreds of kilobytes and its operation correspondingly needs to be speedy.

However, when a SIM card is inserted into a mobile terminal, the terminal commences to read all data stored on the SIM card. Therefore, the time taken for reading the data increases with memory capacity. This will be described in more detail, with an example of reading EF Abbreviated Dialing Numbers ($EF_{ADN}$) having phonebook data. FIG. 2 is a diagram illustrating a conventional signal flow for reading data from $EF_{ADN}$.

Referring to FIG. 2, when a user selects a phonebook menu, a Mobile Equipment (ME) 10 transmits a Select $EF_{ADN}$ command to a SIM 20 in order to select a particular file having phonebook data in step 30. That is, the ME 10 selects a corresponding EF before reading data from $EF_{ADN}$. In step 40, the SIM 20 transmits a response allowing reading of $EF_{ADN}$ information from an EF Access Rule Reference ($EF_{ARR}$) to the ME 10. Since a reference to the access rule of $EF_{ADN}$ is stored in $EF_{ARR}$, the SIM 20 notifies of the position of information about $EF_{ADN}$ in $EF_{ARR}$. The $EF_{ADN}$ information includes an $EF_{ADN}$ ID, record numbers, and the like. The record number is used to identify each field because a large amount of data with the same characteristic is stored in one EF in a linear fixed type that stores data in records.

$EF_{ADN}$ for storing phonebook data has the configuration illustrated in FIG. 3. FIG. 3 illustrates a capture of the state of data stored in $EF_{ADN}$. Although data is stored in the first and third records as illustrated in FIG. 3, the ME 10 transmits as many Read Record commands as the total number of records in $EF_{ADN}$ to the SIM 20 in order to read data from $EF_{ADN}$ in step 50. Given 500 records in $EF_{ADN}$, the ME 10 transmits 500 Read Record commands to the SIM 20. Even if data are stored only in part of the records of $EF_{ADN}$, as many Read Record commands as the total number of the records are transmitted.

While at present, the typical SIM card accommodates 100 to 250 phonebook records, a SIM card having 500 phonebook records has been produced. Since the number of phonebook records is increasing to a multiple of 250, there exists a need for increasing a speed at which an EF of a phonebook record type or any other record type is read.

Moreover, the memory capacity of the SIM card is increasing exponentially from 32K up to 128K and phonebook lists that can be stored in $EF_{ADN}$ are also increasing by multiple times. At present, upon initial booting, the ME processes an initialization process with the SIM in the simple form of an idle state display but when the user selects a phonebook menu, the ME has to read actual phonebook data. Hence, as the amount of phonebook data increases, the time taken to enter the menu increases. As a result, the time for notifying of the phonebook initialization is lengthened.

For example, 40 seconds is taken for a SIM card supporting 250 records, and 1 minute 30 seconds for a SIM card supporting 500 records. Therefore, the user has to wait until the phonebook initialization ends.

As described above, after power-on, the conventional ME reads all EFs from the SIM card and stores them in its cache during a SIM initialization. In the case of a record-type EF, the initialization time increases exponentially according to the number of records, thereby increasing the time for entering into an idle state. As a consequence, the time required for entering the idle state increases with the memory capacity of the SIM card.

SUMMARY OF THE INVENTION

An object of the present invention is to substantially solve at least the above problems and/or disadvantages and to provide at least the advantages below. Accordingly, an object of the present invention is to provide a method and apparatus for increasing a data read speed from a SIM in order to efficiently reduce the time taken for reading data from the SIM.

According to one aspect of the present invention, in a method for increasing a data read speed from a SIM in a mobile communication terminal, a first EF for storing information about valid records in each EF is accessed, upon initial booting. Valid records with data among records of a desired EF are determined based on the valid record information of the first EF, where only the valid records are read.

According to another aspect of the present invention, an apparatus for increasing a data read speed from a SIM includes the SIM and a mobile communication terminal. The SIM stores a plurality of EFs with data used for each service, a first EF for storing information about valid records in each EF, and a second EF for storing an access rule reference of each of the EFs. The mobile communication terminal, upon initial booting, accesses the first EF, determines valid records with data in a desired EF based on the valid record information of the first EF, and reads only the valid records.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a method for efficiently reducing a data reading time from a SIM. For this purpose, information about a particular EF including information about valid records with actual data in the EF is acquired and only the valid records are read based on the EF information. Therefore, a reading time is minimized with respect to memory capacity.

Figure 1:
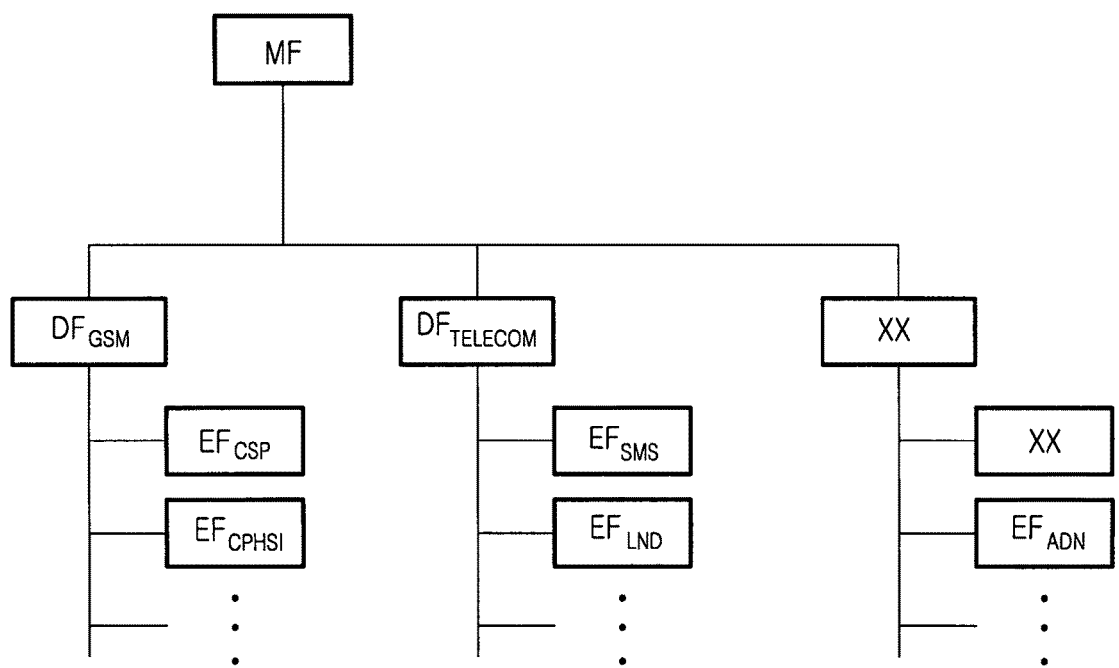
FIG. 1 illustrates the file system structure of a typical SIM card.
Figure 2:
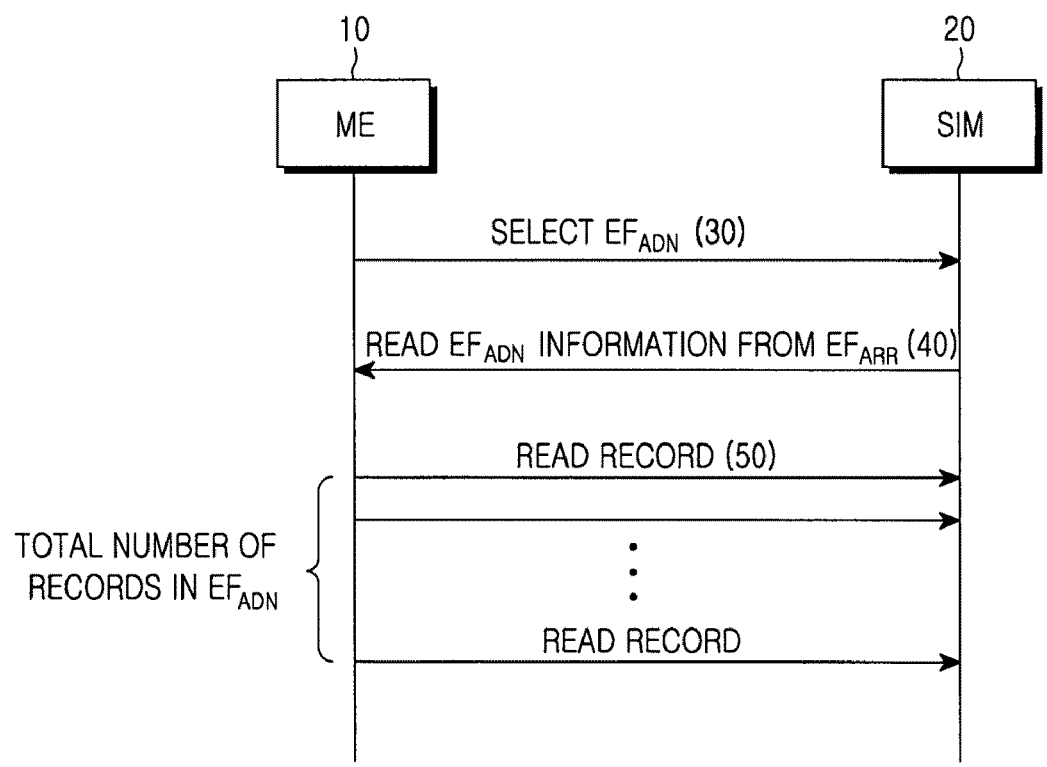
FIG. 2 is a diagram illustrating a signal flow for a conventional operation for reading data from $EF_{ADN}$.
Figure 3:
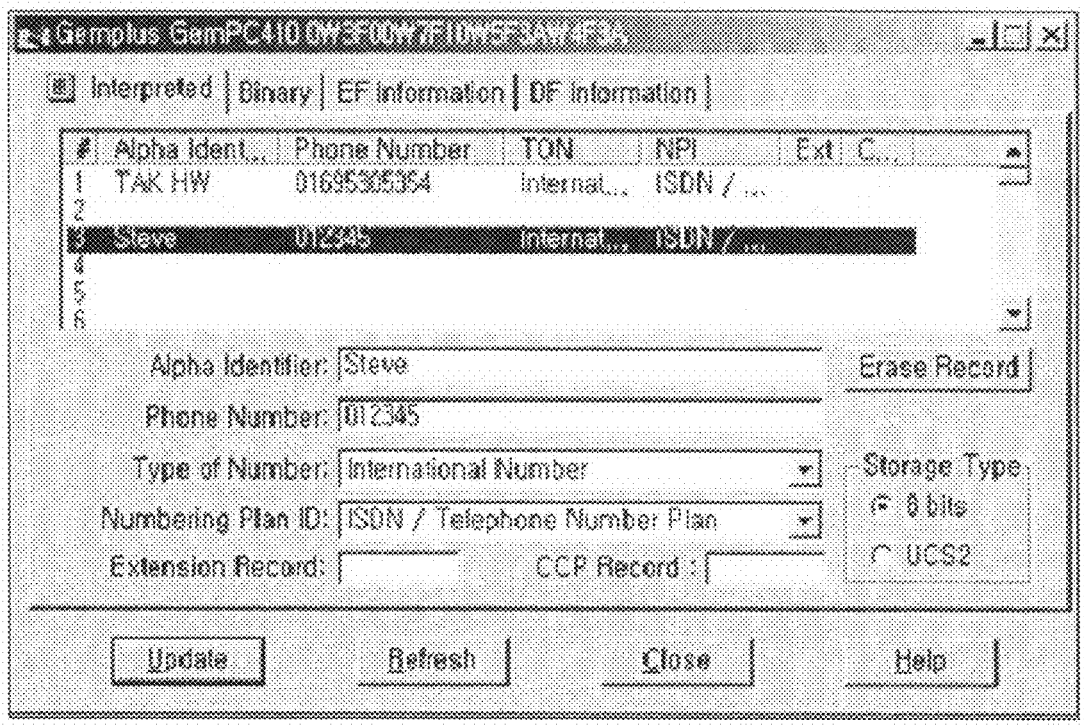
FIG. 3 illustrates a capture of the state of data stored in $EF_{ADN}$.
Figures 4, 5:
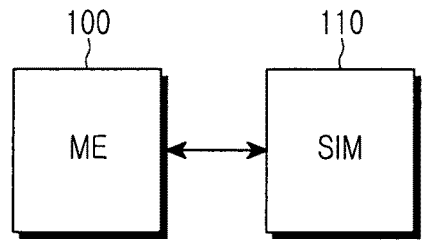
FIG. 4 is a block diagram of an apparatus for selectively reading records according to the present invention.
FIG. 5 illustrates the structure of an EF Record Number Reference ($EF_{RNR}$) for storing information about valid records according to the present invention.

FIG. 4 is a block diagram of an apparatus for selectively reading records according to the present invention. Referring to FIG. 4, the selective record reading apparatus includes an ME 100 and a SIM 110 inserted into the ME 100.

In operation, when the ME 100 is booted with the SIM 110 inserted, it performs initialization with the SIM 110. Hence, the ME 100 authenticates the SIM 110 and starts to read from the SIM 110. According to the present invention, the ME 100 accesses $EF_{RNR}$ within the SIM 110 during the initial booting, determines valid records with actual data among records of a corresponding EF based on the valid record information of $EF_{RNR}$, and reads only the valid records from the EF.

As such, the ME 100 has to refer to an ARR to have access to a desired EF in the SIM 100. The ARR is referred to when reading $EF_{RNR}$ having valid record information in order to read only valid records in an EF within the SIM 100 according to the present invention.

The SIM 110 is a smart card module inserted into the ME 100. It stores non-volatile data such as information about a service provider to which the user has subscribed and has a personal phonebook, carries out limited encryption, and implements software. Since the SIM 110 stores phone numbers, a personal security key, and data needed for the operation of the ME 100, it can be inserted into a new ME other than the ME 100, so that the information on the SIM 110 still can be used. This is known in the field of mobile communications, and thus a detailed description is omitted. The SIM 110 includes $EF_{RNR}$ for storing information about valid records in each EF, $EF_{ARR}$ for storing the access reference rule of each EF, and a plurality of EFs for storing data used for each service.

FIG. 5 illustrates the structure of $EF_{RNR}$ for storing information about valid records according to the present invention.

Since EFs are based on mobile communication standards, a SIM file system of the present invention is an extension of the conventional SIM file system, advantageously ensuring the use of conventional software. $EF_{RNR}$ is divided into Identifier, Structure, Record Length, and Software Command. Depending on the definition of an EF, an identifier is variable. In the SIM file system of the present invention, the file ID of $EF_{RNR}$, 'XXXX' is allocated to provide valid record information.

Structure indicates an EF file structure. The standards define the EF types of transparent, linear fixed, and cyclic. Because data with the same property are stored in the same EF and thus a record number in the present invention identifies each field, the linear fixed type is suitable in which data is stored in records.

Record Length indicates the size of stored valid data information. Software Command for controlling record data information stored in $EF_{RNR}$ can be READ, UPDATE, DEACTIVATE, ACTIVATE, and the like and the condition of implementing each command includes ALW and ADMinistration (ADM).

Figure 6:
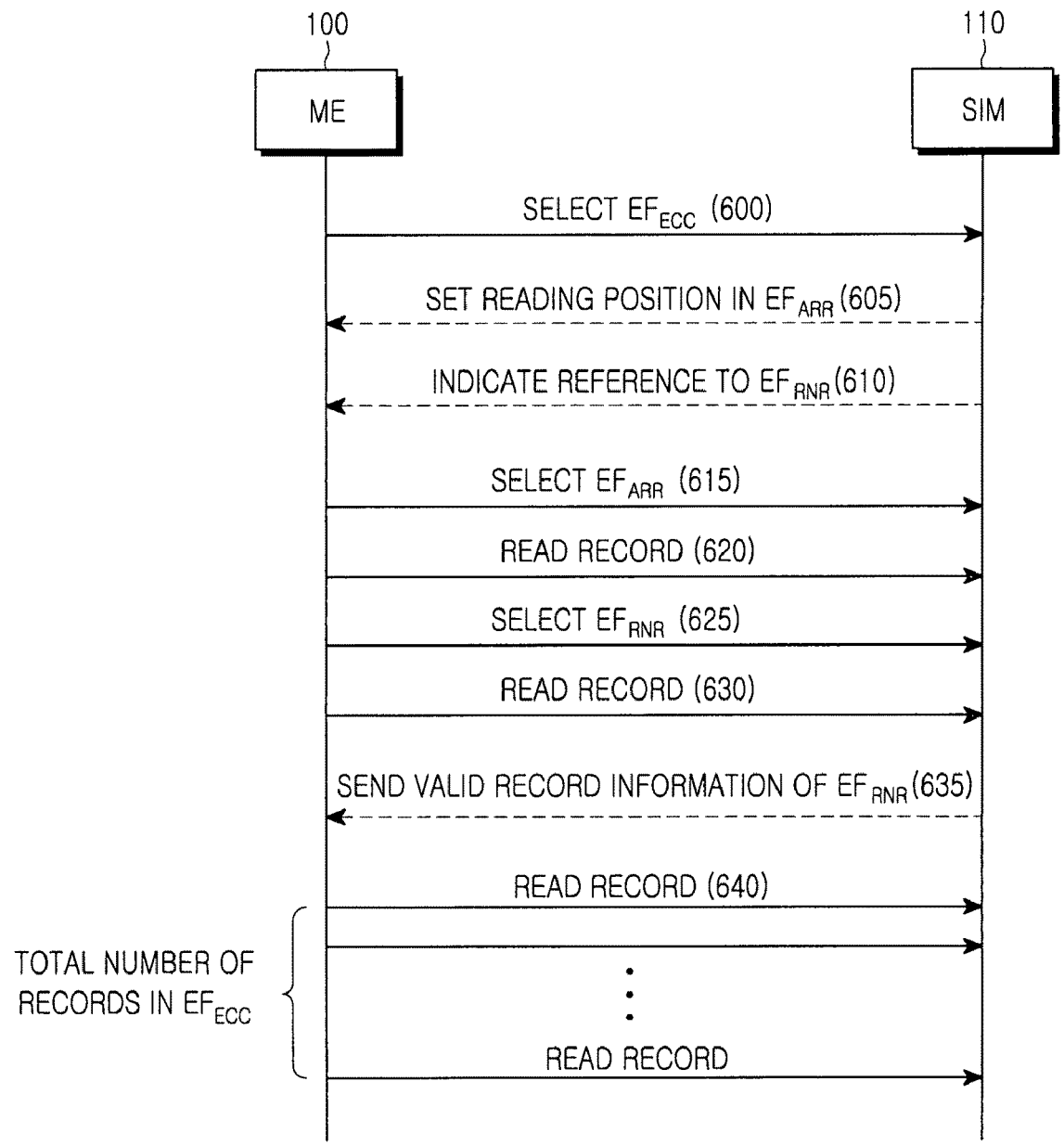
FIG. 6 is a diagram illustrating a signal flow between an ME and a SIM, for reading only valid records according to invention.

Now a description will be made of an operation for reading valid record information from $EF_{RNR}$ having the above configuration and selectively reading only valid records with data based on the valid record information. FIG. 6 is a diagram illustrating a signal flow between the ME and the SIM, for reading only valid records according to the present invention. In the illustrated case of FIG. 6, valid records are read from EF Emergency Call Code ($EF_{ECC}$) among record-type EFs.

Referring to FIG. 6, the ME 100 transmits a command for selecting $EF_{ECC}$ in order to read valid records from $EF_{ECC}$ in step 600. The SIM 110 sets a position to read in $EF_{ARR}$ in step 605 and transmits a response indicating that $EF_{RNR}$ at the position is to be referred to in step 610. That is, the ME 100 is lead to read information about $EF_{RNR}$ with valid record information at a designated position of $EF_{ARR}$.

Thus, the ME 100 transmits a Select $EF_{ARR}$ command in step 615 and transmits a Read Record command to read the $EF_{RNR}$ information at the designated position of $EF_{ARR}$ in step 620. In step 625, the ME 100 transmits a select $EF_{RNR}$ command to access $EF_{RNR}$ based on the $EF_{RNR}$ information. The ME 100 transmits a Read Record command to read valid record information from $EF_{RNR}$ in step 630. Since this Read Record command is used to retrieve information from a corresponding record, the SIM 110, upon receipt of the Read Record command, transmits the information of the record, which is partially depicted in FIG. 6, with only a response part shown.

Upon reception of the Read Record command for reading the valid record information from $EF_{RNR}$, the SIM 110 transmits the valid record information of $EF_{RNR}$ in step 635. The valid record information indicates records with actual data. In this way, the ME 110 can determine the positions of the valid records. In step 640, the ME 100 transmits a Read Record command to the SIM 110 to read the valid records. Because the ME 100 already has knowledge of the valid records, it transmits as many Read Record commands as the number of the valid records of $EF_{ECC}$, thereby minimizing a reading time.

The above-described operation for reading the valid records of $EF_{ECC}$ is performed by the following algorithm shown in Table 1 below.

TABLE 1

Select ECC
Select ARR
Read Record (4)
Select RNR
Read Record (3)
Read Record (1)
Read Record (3)
Read Record (5)

Table 1 illustrates an operation for reading valid records from $EF_{ECC}$ in the case where a total of 10 records are given and data is present only in records #1, #3 and #5. In order to read $EF_{ECC}$, the ME 100 selects an MF from the SIM 110 and then selects a DF to which the corresponding EF belongs, which is known in the conventional art and which will not be described in detail.

For the Select $EF_{ECC}$ command, the SIM 110 transmits a response including record #4 indicating a position to read in $EF_{ARR}$, i.e. the position of $EF_{RNR}$, and record #3 indicating a valid record of $EF_{ECC}$ in record #4. Thus, the ME 100 transmits Read Record (4) to read record #4 of $EF_{ARR}$ and transmits Read Record (3) to read record #3 of $EF_{RNR}$.

Figure 7:
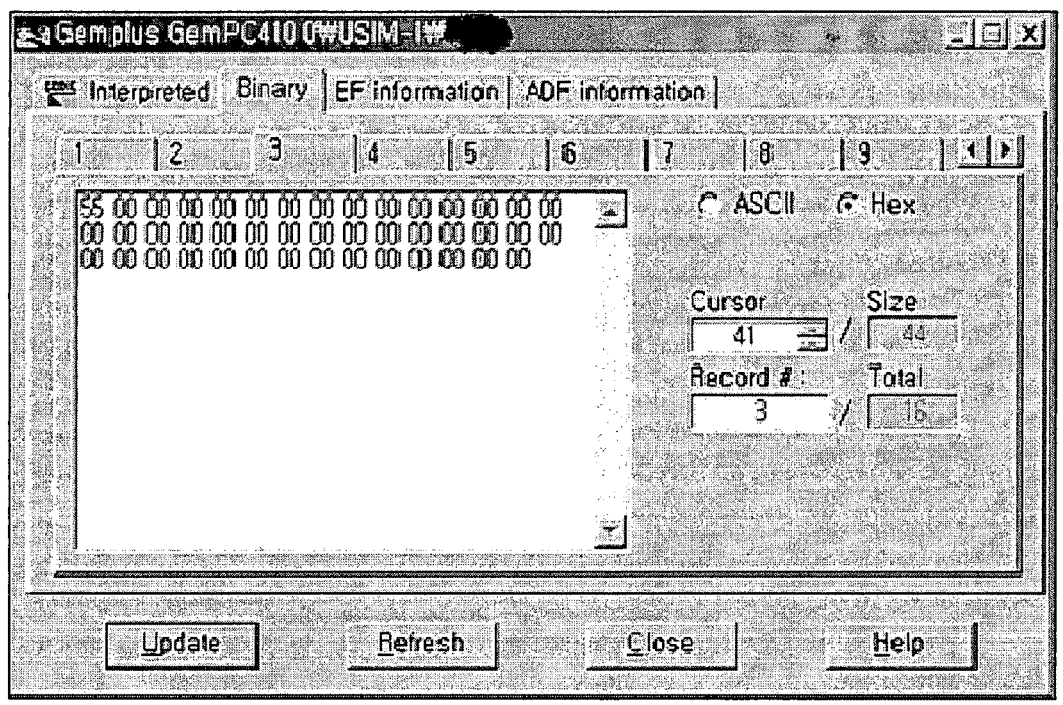
FIG. 7 illustrates a capture of record #3 read from $EF_{RNR}$ according to the present invention.

The result of reading record #3 of $EF_{RNR}$ is shown in FIG. 7. FIG. 7 illustrates a capture of record #3 read from $EF_{RNR}$ according to the present invention. In record #3 of $EF_{RNR}$, '1' is set in the presence of data in a record of $EF_{ECC}$ and '0' is set in the absence of data in the record.

In FIG. 7, the result of reading record #3 of $EF_{RNR}$ is expressed as a Hex value. The Hex value is given as '55 00 00 . . . ' equivalent to a binary value '0001 0101 0000 0000 0000 . . . ' The ME 100 determines from the value that records #1, #3 and #5 have data and thus transmits three Read Record commands, including Read Record (1), Read Record (3) and Read Record (5), to the SIM 10 for reading data from the three records. Accordingly, the ME 100 can selectively read only records with actual data in a desired EF, without reading every record in the EF.

As described above, the present invention remarkably increases an initialization speed by providing a selective record reading method in a SIM card whose capacity is increasing.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of increasing a data read speed from a subscriber identity module (SIM) in a mobile communication terminal, the method comprising the steps of:
   accessing a first elementary file (EF) for storing information about valid records in each EF, upon initial booting;
   determining valid records with data among records of a desired EF based on the valid record information of the first EF;
   reading only the valid records;
   transmitting a command for selecting the desired EF from among a plurality of EFs upon initial booting;
   accessing a second EF for storing an access rule reference of the selected EF; and determining a record position for the first EF from the second EF and accessing the first EF.

2. The method of claim 1, further comprising—:
   receiving a record position for the second EF and the record position for the first EF from the SIM for determining the record position for the first EF in the second EF; and
   determining the record position for the first EF in the second EF and reading information about valid records of the selected EF from the determined record position.

3. The method of claim 1, wherein the valid records reading step comprises:
   determining positions of the valid records with data in the desired EF by reading the first EF; and
   transmitting read record commands for reading the valid records to the SIM.

4. The method of claim 3, wherein the number of the read record commands is equal to the number of the valid records in the desired EF.

5. An apparatus for increasing a data read speed from a subscriber identity module (SIM), the apparatus comprising:
   the SIM for storing a plurality of elementary files (EFs) with data used for each service, a first EF for storing information about valid records in each EF, and a second EF for storing an access rule reference of each of the EFs; and
   a mobile communication terminal for upon initial booting, accessing the first EF, determining valid records with data in a desired EF based on the valid record information of the first EF, and reading only the valid records,
   wherein the mobile communication terminal transmits a command for selecting the desired EF among the plurality of EFs upon initial booting, accesses a second EF for storing an access rule reference of the selected EF, determines a record position for the first EF from the second EF, and accesses the first EF.

6. The apparatus of claim 5, wherein the SIM transmits to the mobile communication terminal a record position for the second EF and the record position for the first EF from the SIM so that the mobile communication terminal can determine the record position for the first EF in the second EF.

7. The apparatus of claim 5, wherein the mobile communication terminal determines the record position for the first EF in the record position for the second EF, and reads the valid record information of the selected EF from the determined record position.

8. The apparatus of claim 5, wherein the mobile communication terminal determines positions of the valid records with data in the desired EF by reading the first EF in the SIM, and transmits read record commands for reading the valid records to the SIM.

9. The apparatus of claim 8, wherein the number of the read record commands is equal to the number of the valid records in the desired EF.

\* \* \* \* \*